United States Patent [19]
Petersen et al.

[11] 3,876,702
[45] Apr. 8, 1975

[54] N,N-BIS-(DIPHENYLALKYL)-ALKYLENDIAMINE AND THEIR SALTS

[76] Inventors: Rudolf Theodor Petersen, Dorfstrasse 22, Wohltorf nr. Aumuhle; Hans Friedrich Benthe, Kieler Strasse 7, Bad Bramstedt, both of Germany

[22] Filed: Dec. 10, 1973

[21] Appl. No.: 423,287

Related U.S. Application Data

[63] Continuation-in-part of Ser. No. 254,624, May 18, 1972, abandoned, which is a continuation of Ser. No. 819,462, April 25, 1969, abandoned.

[30] Foreign Application Priority Data
Apr. 26, 1968 Germany............................ 1768297

[52] U.S. Cl...... 260/570 R; 260/558 R; 260/562 P; 260/566 F; 260/570.5 P; 424/330
[51] Int. Cl............................................. C07c 87/28
[58] Field of Search............................. 260/570.5 P

[56] References Cited
UNITED STATES PATENTS
3,128,308   4/1964   Doub et al...................... 260/570 X

*Primary Examiner*—Robert V. Hines

[57] ABSTRACT

N,N'-bis-(diphenylalkyl)-alkylenediamines of the general structure

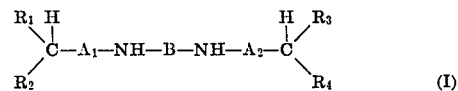

wherein $R_1$, $R_2$, $R_3$ and $R_4$ are unsubstituted phenyl radicals, whereby one of these phenyl radicals or two of the phenyl radicals positioned on the opposite ends of the structure, can be singly or doubly substituted by alkyl- or alkoxy groups having one to three carbon atoms, by hydroxyl groups or by halogen atoms or once by a

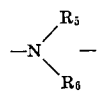

group, wherein $R_5$ and $R_6$ are equal or different, representing alkyl radicals having one to three carbon atoms, or where one of the symbols $R_1$, $R_2$, $R_3$ or $R_4$ can represent a cycloaliphatic residue having five to seven carbon atoms, where $A_1$ and $A_2$ can be equal or different, representing unbranched or branched alkylene chains having one to four carbon atoms, or represent a direct link, and where B is an unbranched or branched alkylene chain having two to four carbon atoms, whereby in the event that B is a chain having 3 carbon atoms, one hydrogen atom belonging to the middle $CH_2$-group, can, if necessary, be replaced by an OH-group, and their obvious physiologically compatible acid addition salts having the same activity, which are characterized by exhibiting a strong coronary vasodilator effect.

11 Claims, No Drawings

N,N-BIS-(DIPHENYLALKYL)-ALKYLENDIAMINE AND THEIR SALTS

CROSS-REFERENCE TO RELATED APPLICATIONS

This Application is a Continuation-in-part application of our Co-pending application, Ser. No. 254,624, filed May 18, 1972, which in turn was a Continuation Application of our earlier Co-pending application, Ser. No. 819,462, filed Apr. 25, 1969, both now abandoned and claims priority from Apr. 26, 1968, based on West German Patent Application, Ser. No. P 1768297.2.

SUMMARY OF THE INVENTION

The present invention relates to new, therapeutically useful N,N'-bis-(diphenylalkyl)-alkylenediamines of the general structure

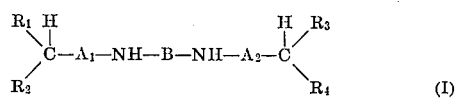

(I)

wherein $R_1$, $R_2$, $R_3$ and $R_4$ are unsubstituted phenyl radicals, whereby one of these phenyl radicals, or two of the phenyl radicals positioned on the opposite ends of the structure, can be singly or doubly substituted by alkyl- or alkoxy groups having one to three carbon atoms, by hydroxyl groups or by halogen atoms or once by a

group, wherein $R_5$ and $R_6$ are equal or different, representing alkyl radicals having one to three carbon atoms, or where one of the symbols $R_1$, $R_2$, $R_3$ or $R_4$ can represent a cycloaliphatic residue having 5 to 7 carbon atoms, where $A_1$ and $A_2$ can be equal or different, representing unbranched or branched alkylene chains having one to four carbon atoms, or represent a direct link, and where B is an unbranched or branched alkylene chain having two to four carbon atoms, whereby in the event that B is a chain having 3 carbon atoms, one hydrogen atom belonging to the middle $CH_2$-group, can, if necessary, be replaced by an OH-group, and their obvious physiologically compatible acid addition salts having the same activity. The new compounds of structure I in accordance with the invention, and their acid addition salts, are characterized by exhibiting a strong coronary vasodilator effect. In animals tested, the compounds encompassed by Formula (1) have proven to be clearly superior in their coronary vasodilator effectiveness when compared to the known structurally similar coronary vasodilator N-[3'-phenyl propyl-(2')] -1, 1-diphenyl propyl-(3)-amine (international generic name: Prenylamine). The coronary vasodilator effect of the new compounds in accordance with this invention is largely selective and is not accompanied by a hypotensive effect. The coronary effect as such does not come about via an increase of metabolism of the heart, as is assumed to be the case in connection with other known similar heart medicaments. The lower dose limit for intravenous administration with which an increase of the coronary circulation of blood can be achieved, appears to be approximately 0.25 mg/kg body weight. Even by intraduodenal administration the present new substances achieve an increase in coronary blood circulation. No serious side effects have been observed during administration of the new substances according to the invention.

The superiority of the new N,N'-bis-(diphenylalkyl)-alkylenediamines according to this invention over the known N-[3'-phenyl propyl-(2')]-1, 1 -diphenyl propyl-(3)-amine of similar constitution can be seen from the accompanying table, in which the results of comparative experiments on cats with completely intact heart-circulatory systems after intravenous and intraduodenal administration of the substances have been listed. The comparative examination of the selective effect of coronary effective substances on the vessels has been carried out in form of continuous measuring of the coronary blood circulation (circulation of the left ventricle) calorimetrically in accordance with the method described in Naunyn-Schmiedebergs Archiv for Pharmacology, Vol. 225 (1966), page 3.

The N,N'-bis-(diphenylalkyl)-alkylenediamines in accordance with the invention, can be used as such, preferably however in form of their crystalline acid addition salts. If necessary or desirable, they can be mixed with suitable solid or liquid carriers of conventional type, for the preparation of solutions for injection purposes and for oral administration, in dragees, pills or tablets.

DETAILED DESCRIPTION OF THE INVENTION

The new compounds of structure I can be prepared as follows:

1. by reacting an alkylene dihalide with a diphenylalkylamine of the general structure

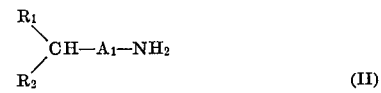

(II)

wherein $R_1$, $R_2$ and $A_1$ have the above mentioned meaning, in a molar ratio of from 1:2 to 1:4, whereby the condensation is appropriately carried out without hydrogen halide acceptor in the presence or absence of an organic solvent at room temperature or at increased temperature. Illustrative of the organic solvents suitable for purposes of this invention preferably, lower alcohols can be used.

2. by reduction of a compound of the structure I, wherein one or several $CH_2$ -groups adjacent the nitrogen atoms are substituted by CO-groups.

As a reducing agent for this purpose, lithium aluminium hydride is suitable in about 4-fold excess, compared to the mol-ratio, and reduction is preferably carried out in a suitable organic solvent, as for instance diethylether or tetrahydrofurane, in such a manner, that the solution of the acid amide is under cooling dropwise added to the lithium aluminium hydride suspension in the selected solvent, and thereafter the reaction mixture is for several hours under reflux-conditions boiled.

3. by reaction of a diphenylalkyl halide of the general structure

wherein $R_1$, $R_2$ and $A_1$ have the above mentioned meaning, with an alkylenediamine of the general structure $H_2N—B—NH_2$, wherein B likewise has the above mentioned meaning, in the presence or absence of an organic solvent, as for instance ethanol, by heating for several hours to the reflux temperature of the selected solvent, in case the reaction is carried out in the presence of an organic solvent, or to temperatures between 50° and 150°C, if one works without a solvent.

4. by reaction of aliphatic compounds comprising two CO-groups and altogether two to four carbon atoms per molecule, with an amine of structure II under reducing conditions, preferably using sodium borohydride ($NaBH_4$) as the reducing agent. Thereby is the mixture of the keto-compound and of the amine first heated to a temperature of about 100° to 130°C, the azomethine, which has, during the reaction been formed as an intermediate product, is dissolved in a low alcohol. The reducing agent is, under cooling added to this solution and the thus obtained reaction mixture is thereafter under reflux conditions, boiled for several hours.

5. by reacting a compound of the general structure

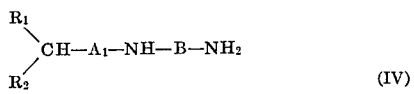

wherein $R_1$, $R_2$, $A_1$ and B have the above mentioned meaning, with a CO-comprising compound of the type

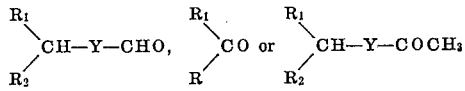

wherein Y is an unbranched or branched alkylene group or a direct linkage. The reduction of the azomethines which form during this reaction intermediary, can be carried out with sodium and alcohol, preferably however under use of sodium borohydride as reducing agent. If sodium borohydride is used, the reduction should suitably be carried out as described under (4); should, however the reduction be carried out by using sodium, the best working conditions, are achieved if there is an excess of metal if one works with the alcohol at boiling temperature. For this purpose lower alcohols having two to five carbon atoms per molecule can be used.

6. when B in structure I stands for the group $—CH_2—CHOH—CH_2—$ : by reacting of an amine of structure II with epichlorohydrin, whereby the condensation with or without addition of a halogen acceptor can be carried out in one step at increased temperature without isolation of the intermediate product. The reaction is thereby preferably carried out in such a manner that the epichlorohydrin is, at increased temperatures (about 100°C) dropwise added into the amine, which in relation to the mol-ratio of the reaction partner is about 4 times in excess, and the reaction mixture is subsequently further heated for several hours.

7. by reduction of a compound of structure I, which however is different from the illustrated structural drawing and the definition of the symbols, comprising unsaturated links in chains $A_1$, $A_2$ and B, and, if necessary, additional CO groups adjacent the nitrogen atoms, using Raney nickel, catalysts of a noble-metal or lithium aluminium hydride. If carbonyl groups and unsaturated compounds are present in the molecule of the starting substance at the same time, the use of lithium aluminium hydride is necessary for the reduction, whereby preferably working conditions are selected as described under (2.) If the reduction is, however carried out by using Raney-catalysts, it is suitable to work at temperatures of about 20° to 100°C, under pressure of about 50 to 100 atmospheres.

The further processing of the reaction product is carried out as usual and does not present any technical difficulties.

The new N,N'-bis-(diphenylalkyl)-alkylenediamines can, after isolation, and purifying, if necessary be converted into acid addition salts by dissolving the compounds in an organic solvent, as for instance alcohol, and by subsequently precipitating the same with inorganic or organic acids in ways which will be obvious to persons skilled in the art.

A better and more thorough understanding of the present invention will be gained from a thorough review of the following Examples, which are merely intended to be illustrative and not limitative of the present invention.

EXAMPLE 1

N,N'-bis-(3,3-disphenylpropyl)-(1))-ethylenediamine dihydrochloride.

42 g (0.2 Mol) of 3,3-diphenylpropylamine are heated to 110°C and are under simultaneous stirring within 80 minutes dropwise mixed with 9.4 g (0.05 Mol) of ethylenebromide. To this mixture are added 50 ml of ethanol and the reaction mixture is then heated until it dissolves. To the resulting solution are added, under stirring 4 g of powder sodium hydroxide, and the precipitated sodium bromide is filtered off. Thereafter, the solvent is evaporated under reduced pressure and the excess amine which is yet in the residue, is distilled off under oil vacuum. The residue which is free of excess amine is subsequently dissolved in ether and the ethereal solution is then shaken with water. After the ethereal solution has been dried with sodium sulfate, the solvent is distilled off under vacuum and the residue is dissolved in methanol. The crystal sludge which had precipitated after ethereal hydrochloric acid was added to this solution in methanol, is fractionally drawn off with suction, washed, dried and, if necessary, recrystallized with a mixture of methanol and a small amount of water. N,N'-bis-(3,3-diphenylpropyl-(1))-ethylenediamine 2 HCl having a melting point of 232°–233°C (whereby it first browns) is obtained. Yield: 31%.

EXAMPLE 2

N,N'-bis-(4,4-diphenylbutyl-(2))-ethylenediaminedihydrochloride.

A solution of 22.1 g (0.0465 Mol) of N,N'-bis-(4,4-diphenylbutyl-(2))-glycineamide in 120 ml of absolute ether are added dropwise, under cooling to a suspension of 3.8 g of lithium aluminium hydride in 280 ml of absolute ether. Subsequently, the reaction mixture is boiled for 6 hours under reflux conditions. After decomposition of the excess reduction medium with ethyl acetate and a small amount of water, the inorganic ingredients are filtered off and several times washed with ether. The ether phases are then united, dried with sodium sulfate, and the solvent is evaporated. The thus obtained residue is now precipitated as phosphate from the alcoholic solution. The base which has been liberated from the residue by use of caustic soda is subsequently in usual manner transferred into the dihydrochloride of the N,N'-bis(4,4-diphenylbutyl-(2))-ethylenediamine, which after recrystallization from isopropanol/ether and water has a melting point of 230° to 232°C. Yield: 20%.

Analogue to the method described in the above example, the following new N,N'-bis-(diphenylalkyl)-alkylenediamines can be produced as well as their hydrochloride salts:

N-(3,3-diphenylpropyl-(1))-N'-(diphenylmethyl)-ethylenediamine-dihydrochloride
Melting point: 226° to 227°C.
Yield: 26%.

N-(diphenylmethyl)-N'-(3-p-chlorophenyl-3-phenylpropyl-(1))-ethylenediamine dihydrochloride.
Melting point: 214° to 215°C.
Yield: 18%.

N,N'-bis-(3-p-chlorophenyl)-3-phenylpropyl-(1))-ethylenediamine dihydrochloride.
Melting point: 224° – 225°C.
Yield: 17%.

N-(3-p-dimethylaminophenyl-3-phenylpropyl-(1))-N'-(3,3-diphenylpropyl-(1))-ethylenediamine-trihydrochloride.
Melting point: 219° to 220°C.
Yield: 58%.

N-(3-p-methylphenyl-3-phenylpropyl-(1))-N'-(3,3-diphenylpropyl-(1))-ethylenediamine-dihydrochloride.
Melting point: 196° to 197°C.
Yield: 38%.

N-(3-cyclohexyl-3-phenylpropyl-(1))-N'-(2,2-diphenylethyl-(1))-ethylenediamine-dihydrochloride.
Melting point: 207° to 209°C.
Yield: 12%.

EXAMPLE 3

N-(o-chlorophenylphenylmethyl)-N'-(3,3-diphenylpropyl-(1))-ethylenediamine dihydrochloride.

A solution of 23.4 g (0.05 Mol) of N-(3,3-diphenylpropyl-(1))-(o-chlorophenyl phenyl methylamino)-acetamide in tetrahydrofurane is under cooling dropwise added to a suspension of 3.8 g of lithium aluminium hydride in 100 ml of tetrahydrofurane. After 5 hours of boiling of the reaction mixture under reflux conditions, the excessive lithium aluminium hydride is decomposed with a small amount of water, the inorganic portion is filtered off and washed with ethanol. After concentration of the filtrate, the remaining residue is dissolved in ethanol and mixed with ethereal hydrochloric acid. The thus resulting precipitate is collected and recrystallized from ethanol/ether. The compound has a melting point of 237° to 238°C.
Yield: 18%.

EXAMPLE 4

N-(3(3,4-dimethoxyphenyl-3-phenyl)propyl-(1))-N'-(3,3-diphenylpropyl-(1))-ethylenediamine dihydrochloride.

26.1 g (0.05 Mol) of N-(3,3-diphenylpropyl-(1))-(3,4-dimethoxyphenyl-3-phenylpropyl-(1)-amino)-acetamide are dissolved in 100 ml of tetrahydrofuran and are under cooling dropwise added to a suspension of 3.8 g of lithium aluminium hydride in 100 ml of tetrahydrofurane. After boiling of the reaction mixture for 5 hours under reflux conditions and subsequent decomposition of the excessive lithium aluminium hydride, one filters and distills the solvent off. The thus obtained residue is then dissolved in ethanol and is precipitated from the solution by adding of ethereal hydrochloric acid until a clearly acid reaction has taken place and the hydrochloride falls out. After the separation and recrystallization from ethanol/ether, the resulting dihydrochloride of N-(3(3,4-dimethoxyphenyl-3-phenyl)propyl-(1))-N'-(3,3-diphenylpropyl-(1))-ethylenediamine has a melting point of 214° to 215°C.
Yield: 48%.

EXAMPLE 5

N,N'-bis-(3,3-diphenylpropyl-(1))-2,3-diaminobutane dihydrochloride.

A mixture of 10.5 g (0.05 Mol) of 3,3-diphenylpropylamine and 2.6 g (0.03 Mol) of diacetyl are for 2 hours heated to 120°C. To the reaction mixture are then added 50 ml of methanol and this mixture is then heated until the mass which is first a syrupy mass, dissolves. To the cooled off solution are added under stirring 5 g of sodium borohydride in portions, one stirs at room temperature for 1 hour and heats thereafter for 2 hours up to reflux temperature. During cooling off, a brown oil separates from the methanolic solution. After the oil is decanted, the solvent is evaporated, under vacuum and the residue is treated with a mixture of water and ether. Thereafter is the ether phase separated, dried with potassium carbonate and mixed with ethereal hydrochloric acid. The resultant precipitate (slightly yellowish crystals) is drawn off with suction and is recrystallized from a mixture of alcohol/ether. Obtained is N,N'-bis-(3,3-diphenylpropyl-(1))-2,3-diaminobutane dihydrochloride, having a melting point of 248° to 249°C. From the previously decanted and separated brown oil, there can be prepared, in a similar manner, additional constituents of the compounds obtained, which exhibit an identical melting point.
Total Yield: 37%.

EXAMPLE 6

N,N'-bis-(3,3-diphenylpropyl-(1))-1,3-diaminopropanol (2)-dihydrochloride.

A mixture of 22.2 g (0.105 Mol) of 3,3-diphenylpropylamine, 3.2 g (0.035 Mol) of epichlorohydrin, 6.9 g (0.05 Mol) of potassium carbonate and 60 ml of n-butanol are heated for 20 hours to a temperature of 110°C. After this period of time, the potassium carbonate is filtered off and the solvent is under vacuum removed by evaporizing. From the thereby obtained residue is the excessive amine first distilled off under oilpump vacuum, and the residue is then added to the ethanol and the ethanolic solution is mixed with ethereal hydrochloric acid until the reaction is clearly acid. The thereby precipitating crystals of N,N'-bis-(3,3-diphenylpropyl-(1))-1,3-diaminopropanol(2)-dihydrochloride are filtered off and recrystallized from ethanol/ether.
Melting point: 217° to 218°C.
Yield: 15%.

EXAMPLE 7

N-(3,3-diphenylpropyl-(1))-N'-(3-cyclohexyl-3-phenylpropyl-(1))-ethylenediamine dihydrochloride.

A solution of 5.8 g (0.017 Mol) of N-(3,3-diphenylpropyl-(1))-(3-cyclohexyl-3-phenylpropyl-(1)amino)-acetamide in 65 ml of absolute ether are under cooling dropwise added to a suspension of 1.3 g (0.035 Mol) of lithium aluminium hydride in 75 ml of absolute ether and the reaction mixture is subsequently under reflux conditions heated for 6 hours. After addition of a small amount of water in order to decompose the excessive lithium aluminium hydrid, the inorganic material is filtered off and washed with ethanol. The solvents are evaporated from the filtrate and the residue is dissolved in methanol. For the conversion of the base into hydrochloride, the methanolic solution is mixed with ethereal hydrochloric acid, the precipitated crystals are separated and twice recrystallized from a mixture of methanol and ether. The obtained compound has a melting point of 192° to 193°C.
Yield: 17%.

EXAMPLE 8

N,N'-bis-(3,3-diphenylpropyl-(1))-ethylenediamine dihydrochloride.

A solution of 13.3 g (0.029 Mol) of N,N'-bis-(3,3-diphenylpropen(2)yl-glycineamide in 75 ml of tetrahydrofurane are, under cooling and under constant stirring dropwise added into a suspension of 2.2 g (0.058 Mol) of lithium aluminium hydride in 75 ml of tetrahydrofurane. The reaction mixture is subsequently, under reflux conditions heated for 5 hours and thereafter is the excessive reduction agent under ice-cooling by careful addition of water decomposed. After the inorganic components have been filtered off and washed with ethanol, the solvent is evaporized under vacuum, the residue is dissolved in ethanol and in order to form a salt mixed with ethereal hydrochloric acid. After several hours, the new compound crystallizes out.
Melting point: 230° to 231°C.
Yield: 18%.

EXAMPLE 9

N,N'-bis-(3,3-diphenylpropyl-(1))-ethylenediamine dihydrochloride.

2.7 g (0.01 Mol) of 3,3-diphenylpropylbromide are dissolved in 10 ml of ethanol and are boiled for 8 hours under reflux conditions with 0.6 g (0.01 Mol) of ethylenediamine. After addition of 20 ml of 2-N soda lye to the reaction mixture, one extracts with ether and after the solvent has evaporated, the excessive starting material is removed from the residue under an oilpump vacuum. The residue is thereafter added to ethanol and the thus obtained solution is acidified with ethereal hydrochloric acid. The precipitated crystals are drawn off by suction and are recrystallized from ethanol. A yield of 21% of N,N'-bis-(3,3-diphenylpropyl-(1))-ethylenediamine × 2 HCl is obtained, having a melting point of 230° to 231°C.

EXAMPLE 10

N-(3,3-diphenylpropyl-(1))-N'-(2,2-diphenylethyl-(1))-ethylenediamine dihydrochloride.

A mixture of 2.5 g (0.01 Mol) of N-(3,3-diphenylpropyl-(1))-ethylenediamine and 1.96 g (0.01 Mol) of diphenylacetaldehyde is for 1½ hours heated to a temperature of 120° to 130°C. After cooling 25 ml of methanol are added and stirred until dissolved. Thereafter are, under stirring 1.5 g of sodium borohydride added in small portions to the reaction mixture, which is subsequently under reflux conditions boiled for 3 hours. After addition of 40 ml of 2-N-hydrochloric acid, the alcohol is distilled off, under vacuum, and the remaining watery phase is twice extracted with ether. Thereafter, the same is alkalized with potassium carbonate, and the formed base is dissolved in ethanol. The hydrochloride is precipitated in ethanol by adding of ethereal hydrochloric acid to the solution of the base, and after separation is completed, fraction recrystallized. One obtains N-(3,3-diphenylpropyl-(1))-N'-(2,2-diphenylethyl-(1))-ethylenediamine dihyrochloride, having a melting point of 206° to 207°C.
Yield: 16%.

| Substance | Doses, mg./kg., intravenous | Maximum increase of coronary circulation, percent | Length of time until initial circulation returns, min. | Maximum decrease of blood pressure, mm. Hg | Length of time until initial blood pressure returns, min. |
|---|---|---|---|---|---|
| 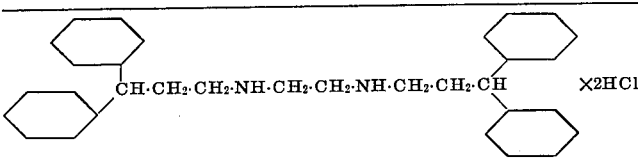 N,N'-Bis-(3,3-diphenyl-propyl-(1))-ethylenediamine-dihydro-chloride | 250 | 60 | 7 | 40–50 | 1 |
| | 500 | 120 | 10 | 40–50 | 4 |
| | 1,000 | 100 | >30 | 60 | 10 |
| | 2,000 | 80 | >30 | 60 | 18 |
| 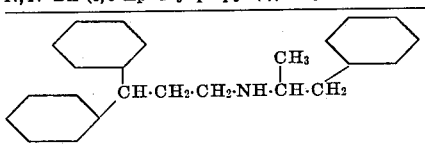 N-(3'-Phenyl-propyl-(2'))-1,1-diphenyl-propyl-(3)-amine (comparison substance) | 250 | φ | φ | 20 | 2 |
| | 500 | 10 | 1 | 25 | 1 |
| | 1,000 | 15 | 8 | 20 | 1 |
| | 2,000 | 25 | 4 | Long lasting decrease in blood pressure | |

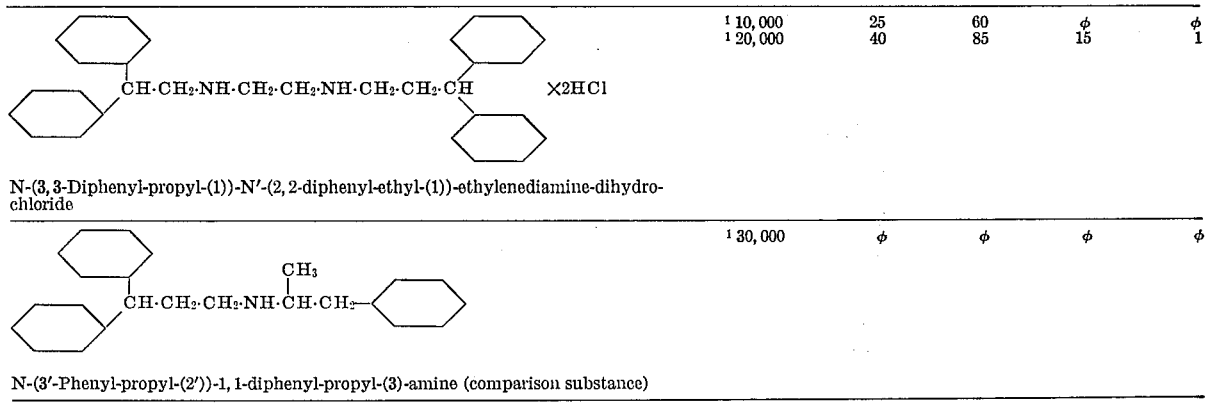

N-(3,3-Diphenyl-propyl-(1))-N'-(2,2-diphenyl-ethyl-(1))-ethylenediamine-dihydrochloride N-(3'-Phenyl-propyl-(2'))-1,1-diphenyl-propyl-(3)-amine (comparison substance)

[1] Intraduodenal.

EXAMPLE 11

N-(3(3,4-dihydroxyphenylphenylpropyl-(1))-N'-(3,3-diphenylpropyl-(1))-ethylenediamine dihydrochloride.

2 g (0.0039 Mol) of N-(3(3,4-dimethoxyphenyl-3-phenylpropyl-(1))-N'-(3,3-diphenylpropyl-(1))-ethylenediamine are under reflux conditions boiled in 12 ml of glacial acetic acid containing 40% hydrogen bromide, in an atmosphere of carbon dioxide. After cooling off, the reaction mixture is diluted with 50 ml of water, alkalized with potassium carbonate, and thereafter twice extracted with chloroform. The chloroform phase is then dried over potassium carbonate and the solvent is evaporated. After the remaining residue has been dissolved in methanol, the dihydrochloride precipitates after addition of ethereal hydrochloric acid to the methanolic solution, exhibited after separation and recrystallization from methanol/ether a melting point of 182° to 184°C.
Yield: 32%.

EXAMPLE 12

N-[3-p-dimethylaminophenyl-3-cyclohexyl-propyl-(1)]-N'-[2,2-diphenyl-ethyl-(1)]-ethylenediamine trihydrochloride.

A solution of 13 g (0,026 mol) of N-[2,2-diphenyl-ethyl-(1)]-[3-p-dimethylaminophenyl-3-cyclohexyl-propyl-(1)]-acetamide in 100 ml absolute tetrahydrofuran was added dropwise with cooling and with continuous stirring to a suspension of 1.5 g (0,039 mol) lithium aluminum hydride in 100 ml absolute tetrahydrofuran. The reaction mixture was then heated for 6 hours under reflux. After addition of a little water for decomposing the excess lithium aluminum hydride, the inorganic material was filtered off and washed with ethanol. The solvent was evaporated from the filtrate and the residue dissolved in ethanol. For conversion of the base into the hydrochloride, the ethanolic solution was treated with ethereal hydrochloric acid. The crystals precipitated were removed by suction filter and twice recrystallized from methanol. The compound obtained had a melting point of 275°–276°C. Yield 27.0%.

Although the present invention has been adequately described in the foregoing specification and examples included therein, it is obvious that various changes and/or modifications can be made thereto without departing from the spirit and scope thereof.

What we claim is:
1. The compound:
   N,N'-bis-[3,3-diphenylpropyl-(1)]-ethylenediamine dihydrochloride.
2. The compound:
   N-[3,3-diphenylpropyl-(1)]-N'-(diphenylmethyl)-ethylenediamine dihydrochloride.
3. The compound:
   N-(diphenylmethyl-N'-[3-p-chlorophenyl-3-phenylpropyl (1)]-ethylenediamine dihydrochloride.
4. The compound:
   N-[3-p-dimethylaminophenyl-3-phenylpropyl-(1)]-N'[3,3-diphenylpropyl-(1)]-ethylenediamine trihydrochloride.
5. The compound:
   N-[3 (3,4-dimethoxyphenyl-3-phenyl)propyl-(1)]-N'-[3,3-diphenylpropyl-(1)]-ethylenediamine dihydrochloride.
6. The compound:
   N,N'-bis-[3,3-diphenylpropyl-(1)]-2,3-diaminobutane dihydrochloride.
7. The compound:
   N,N'-bis-[3,3-diphenylpropyl-(1)]-1,3-diaminopropanol-(2) dihydrochloride.
8. The compound:
   N-[3,3-diphenylpropyl-(1)]-N'-[3-cyclohexyl-3-phenylpropyl-(1)]-ethylenediamine dihydrochloride.
9. The compound:
   N-[3,3-diphenylpropyl-(1)]-N'-[2,2-diphenylethyl-(1)]-ethylenediamine dihydrochloride.
10. The compound:
    N-[3 (3,4-dihydroxyphenyl-3-phenyl)propyl-(1)]-N'-[3,3-diphenylpropyl-(1)]-ethylenediamine dihydrochloride.
11. The compound:
    N-[3-dimethylaminophenyl-3-cyclohexyl-propyl-(1)]-N'-[2,2-diphenylethyl-(1)]-ethylenediamine trihydrochloride.

* * * * *